(12) United States Patent
Turk

(10) Patent No.: US 10,906,509 B1
(45) Date of Patent: Feb. 2, 2021

(54) SYSTEM FOR DELIVERY OF A SHIPMENT AT A VEHICLE

(71) Applicants: DENSO International America, Inc., Southfield, MI (US); Denso Corporation, Kariya (JP)

(72) Inventor: Jeffrey Turk, South Lyon, MI (US)

(73) Assignees: DENSO INTERNATIONAL AMERICA, ING, Southfield, MI (US); DENSO CORPORA TION

( * ) Notice: Subject to any disclaimer, the term of this patent is extended or adjusted under 35 U.S.C. 154(b) by 0 days.

(21) Appl. No.: 16/576,874

(22) Filed: Sep. 20, 2019

(51) Int. Cl.
| | |
|---|---|
| *B60R 25/24* | (2013.01) |
| *G07C 9/00* | (2020.01) |
| *G06Q 10/08* | (2012.01) |
| *G06K 7/10* | (2006.01) |
| *G06K 7/14* | (2006.01) |
| *H04N 7/18* | (2006.01) |

(52) U.S. Cl.
CPC .......... *B60R 25/24* (2013.01); *G06K 7/10297* (2013.01); *G06K 7/1417* (2013.01); *G06Q 10/0833* (2013.01); *G07C 9/00896* (2013.01); *B60R 2325/105* (2013.01); *H04N 7/183* (2013.01)

(58) Field of Classification Search
CPC .. G06Q 30/06; G06Q 10/0832; G06Q 10/083; G06Q 10/0833; G06Q 30/00; G06Q 30/0207; G06Q 10/02; G06Q 10/0835; G06Q 30/02; G06Q 10/06312; G06Q 10/087; G06Q 30/0233; G06Q 50/28; G06Q 10/0837; G06Q 10/0836; G06Q 10/08355; G06Q 10/08345; G06Q 20/407; B60R 25/24; B60R 2325/105; G06K 7/1417; G06K 7/10297; G07C 9/00896; H04N 7/183
See application file for complete search history.

(56) References Cited

U.S. PATENT DOCUMENTS

| | | | | |
|---|---|---|---|---|
| 9,542,832 | B1 * | 1/2017 | Fu | G08B 29/185 |
| 9,565,401 | B1 * | 2/2017 | Graybill | G06F 16/00 |
| 9,635,006 | B2 * | 4/2017 | Oz | H04L 67/18 |
| 9,916,557 | B1 * | 3/2018 | Gillen | G06Q 10/083 |
| 9,916,558 | B2 * | 3/2018 | Wiechers | G05D 1/0027 |
| 10,002,479 | B2 * | 6/2018 | Oz | G07C 5/008 |
| 10,181,111 | B1 * | 1/2019 | Kohli | G01S 5/0027 |
| 10,182,305 | B2 * | 1/2019 | Gillen | G06Q 10/0833 |
| 10,322,696 | B2 * | 6/2019 | Gao | B60R 25/102 |
| 10,402,775 | B2 * | 9/2019 | Lievens | G06Q 10/08355 |
| 10,445,682 | B2 * | 10/2019 | Tibbs | G06Q 10/083 |

(Continued)

FOREIGN PATENT DOCUMENTS

WO 2016093542 A1 6/2016

*Primary Examiner* — Brian E Miller
(74) *Attorney, Agent, or Firm* — Brooks Kushman P.C.

(57) ABSTRACT

A system in a vehicle includes a camera configured to capture images proximate the vehicle. The system also includes a transceiver configured to communicate with a remote server and a processor in communication with the camera and the transceiver. The processor is programmed to send a request to the camera to take one or more images of the delivery driver in response to a location of the delivery driver within a threshold distance from the vehicle, send one or more images of the delivery driver, and send an activation signal to one or more vehicle components to allow access to an area of the vehicle.

20 Claims, 4 Drawing Sheets

(56) References Cited

U.S. PATENT DOCUMENTS

| | | | |
|---|---|---|---|
| 10,460,282 B2* | 10/2019 | Stark | G07C 9/00896 |
| 10,593,173 B2* | 3/2020 | Roth | G08B 25/08 |
| 10,600,022 B2* | 3/2020 | Robinson | G06Q 10/1093 |
| 10,614,410 B2* | 4/2020 | Gillen | G06Q 10/0838 |
| 10,713,869 B2* | 7/2020 | Morris | E05F 15/77 |
| 2007/0193834 A1* | 8/2007 | Pai | G06Q 10/08 |
| | | | 186/3 |
| 2015/0116530 A1 | 4/2015 | Lau et al. | |
| 2016/0098581 A1 | 4/2016 | Marti Ascencio et al. | |
| 2017/0017920 A1* | 1/2017 | Stark | B60R 25/24 |
| 2017/0018181 A1* | 1/2017 | Davidsson | G06Q 10/0835 |
| 2017/0116855 A1* | 4/2017 | Magnusson | G08G 1/146 |
| 2017/0332458 A1* | 11/2017 | Salter | F21S 45/50 |
| 2018/0053365 A1* | 2/2018 | Bode | G06Q 10/0833 |
| 2018/0061164 A1* | 3/2018 | Scalisi | G07C 9/00309 |
| 2018/0129885 A1* | 5/2018 | Potter | G06K 9/00288 |
| 2018/0158265 A1* | 6/2018 | Lyman | G07C 9/20 |
| 2018/0164818 A1* | 6/2018 | Wilkinson | G05D 1/0278 |
| 2018/0240067 A1 | 8/2018 | Oz et al. | |
| 2018/0246526 A1* | 8/2018 | Wilkinson | G05D 1/0291 |
| 2018/0247253 A1* | 8/2018 | Duquene | G06Q 10/083 |
| 2019/0102728 A1* | 4/2019 | Lee | G06Q 10/087 |
| 2019/0122470 A1* | 4/2019 | Endo | H04L 9/088 |
| 2019/0176760 A1* | 6/2019 | Uenoyama | B60R 25/305 |
| 2019/0205831 A1* | 7/2019 | Kanaoka | H04W 4/021 |
| 2019/0236878 A1* | 8/2019 | McHale | G07C 9/00309 |
| 2019/0266562 A1* | 8/2019 | Kanaoka | G06Q 10/0832 |
| 2020/0012998 A1* | 1/2020 | Gillen | G06Q 50/28 |
| 2020/0180560 A1* | 6/2020 | Okada | G06K 9/00255 |

* cited by examiner

SYSTEM FOR DELIVERY OF A SHIPMENT AT A VEHICLE

TECHNICAL FIELD

The present disclosure relates to authentication of deliveries or other services to a vehicle.

BACKGROUND

Vehicles may be a delivery destination for retailers to deliver packages. However, it may be inconvenient for a driver to be present at the vehicle to receive a delivery. On the other hand, if the driver is not present at the vehicle for the delivery, the delivery may be left in an unsecure area as compared to outside of one's home. For example, a delivery left at a vehicle in a public space, such as a parking garage or parking space, may be susceptible to theft or damage.

SUMMARY

According to one embodiment, a system in a vehicle includes a camera configured to capture images proximate the vehicle, a transceiver configured to communicate with a remote server, a processor in communication with the camera and the transceiver. The processor is programmed to determine a delivery driver is located proximate the vehicle in response to a signal from the remote server, send a request to capture one or more images of the delivery driver in response to a location of the delivery driver within a threshold distance from the vehicle, send one or more images of the delivery driver to a remote server, and send an activation signal to one or more vehicle components to allow access to an area of the vehicle.

According to one embodiment, a server includes a transceiver configured to communicate with a vehicle remote from the server. The server also includes a processor in communication with the transceiver. The processor is programmed to determine a delivery driver is located proximate the vehicle in response to a location received from the delivery driver, send a request to capture one or more images of the delivery driver upon the determination that the delivery driver is proximate to the vehicle, receive one or more images from the vehicle or a mobile device associated with the vehicle, and send an activation signal to one or more vehicle components to allow access to an area of the vehicle in response to the authentication of the one or more images.

According to one embodiment, a system in a vehicle includes a camera configured to capture images proximate the vehicle. The system also includes a transceiver configured to communicate with a remote server and a processor in communication with the camera and the transceiver. The processor is programmed to send a request to the camera to take one or more images of the delivery driver in response to a location of the delivery driver within a threshold distance from the vehicle, send one or more images of the delivery driver, and send an activation signal to one or more vehicle components to allow access to an area of the vehicle.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Deliveries from online retailers and brick and mortar stores may be made to a vehicle when the driver is not present. However, delivery drivers and other service people may need access to a vehicle in order to secure a delivery. There may be a need to authenticate and prepare the vehicle for the delivery. The authentication may need to take place without the need for the vehicle owner to be present. A vehicle may include various systems, sub-systems, and components that can be activated when the vehicle is aware that the delivery is imminent.

Figure 1:
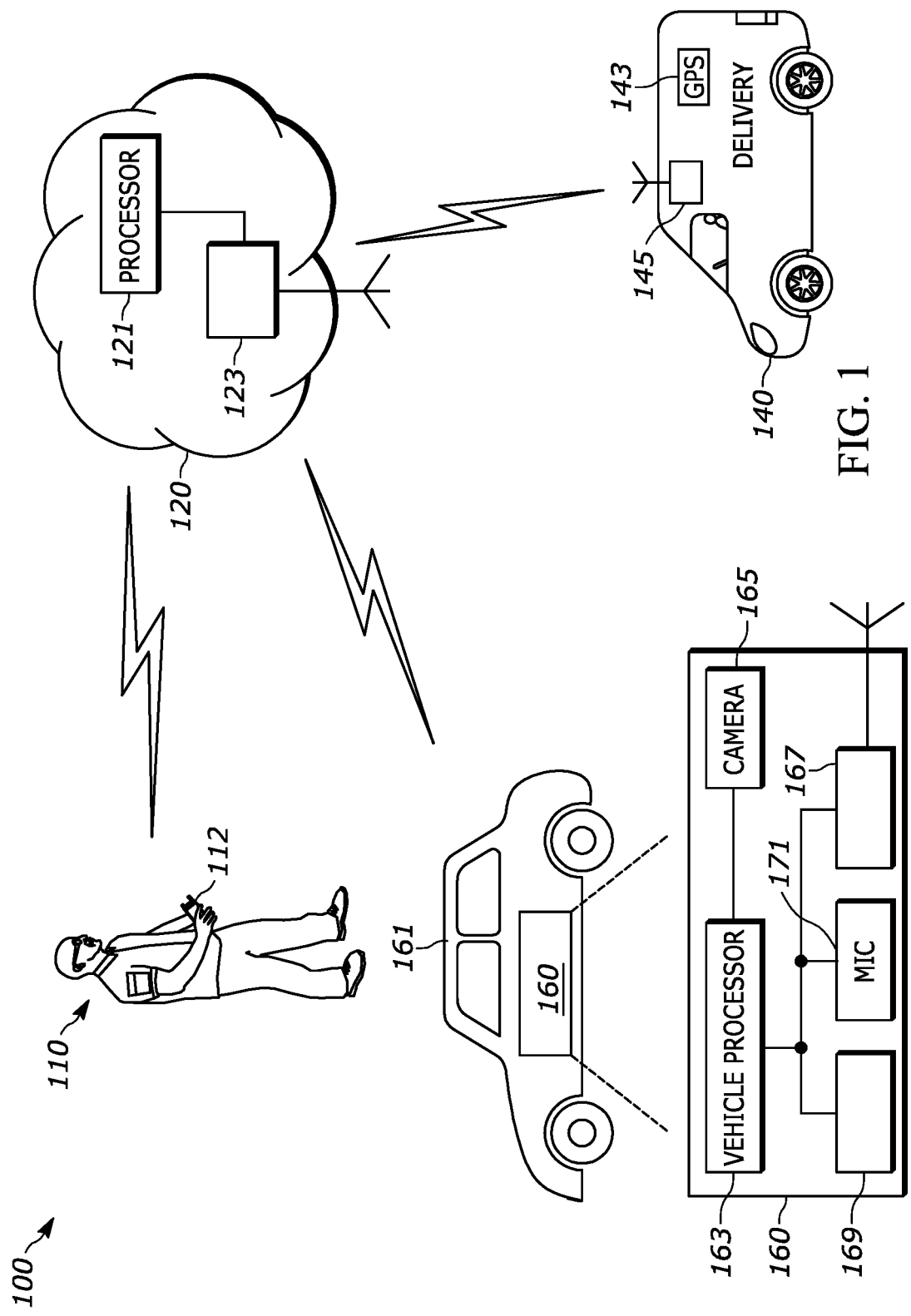
FIG. 1 illustrates an overview of a system 100 according to one embodiment.

As shown in FIG. 1, a system 100 may include a user 110, remote server 120 (e.g., cloud), a delivery vehicle 140, and a vehicle 161. The vehicle 161 may include any type of vehicle, such as a passenger vehicle, a commercial vehicle, motorcycle, sport utility vehicle, minivan, sedan, motorcycle, watercraft, off-road vehicle, etc. The user 110 may be operating a mobile device 112 (e.g., a mobile phone, wearable device, tablet, laptop, etc.) that includes an application that provides tracking information related to a delivery and/or allow operation of the vehicle 161. The mobile device 112 may allow the user 110 to unlock or allow access to the vehicle 161 or various compartments of the vehicle 161, as explained in further detail below.

The delivery vehicle 140 may be equipped with a wireless transceiver 145 and a global positioning system (GPS) receiver 143. The GPS receiver 143 may receive signals transmitted from satellites for the GPS. The GPS receiver 143 may also be in communication with a gyroscope and/or a distance sensor. The GPS receiver 143 may detect a position coordinate and an altitude of the present position of the delivery vehicle 140. If a gyroscope is utilized, it may output a detection signal corresponding to an angular velocity of a rotational motion applied to the delivery vehicle 140. The distance sensor may output a traveling distance of the delivery vehicle 140. In some embodiments, the delivery vehicle 140 may be equipped with a navigation controller that calculates the present position, direction, and velocity of the delivery vehicle 140 based on the output signals from the GPS receiver 143, as well as the gyroscope and the distance sensor. Further, the present position may be calculated in various methods based on the output signal from the GPS receiver 143. For example, a single point positioning method or a relative positioning method may be used to calculate the present position of the delivery vehicle 140. The delivery vehicle 140 may utilize the wireless transceiver 145 to communicate with remote server 120, which may in turn share data with the mobile device 112 or vehicle 161.

The remote server 120 may include a data center controller 121. The data center controller 121 may include a microcomputer, which has a central processing unit (CPU), a read-only memory (ROM), a random access memory (RAM), an input/output (I/O) interface, and a bus line for coupling the CPU, the ROM, the RAM, and I/O interface. The data center controller 121 may include a communication device 123 (e.g., wireless transceiver, telematics device, stand-alone mobile device, or mobile device paired with a Bluetooth transceiver. The remote server 120 may communicate with the communication device 123 using any wired or wireless communication protocol, including but not limited to Long-Term Evolution (LTE), WiFi, Bluetooth, WiGig, global positioning system (GPS), global navigation satellite system (GNSS), near field communication (NFC), or other telecommunication protocol. In an alternate embodiment, the delivery vehicle 140 and the vehicle 161 may also communicate wirelessly according to a known communication protocol such as, for example, the Dedicated Short Range Communication (DSRC) protocol implemented under standards, such as IEEE 802.11p, IEEE 1609, and/or SAE J2735. The DSRC protocol operates over a 75 MHz spectrum band around 5.9 GHz, allocated by the United States Federal Communications Commission (FCC) in the United States. The DSRC protocol may operate over a different dedicated band in other countries. For example, the DSRC protocol in Japan is configured to operate in the 900 MHz spectrum band. The communication device 123 of the remote server 120 performs data communication with the mobile device 112 of the user 110, the delivery vehicle 140, and the vehicle 161. The remote server 120 may be wirelessly coupled to a network via the communication device 123 to allow for data communication to various devices. The remote server 120 may include more than one data centers or servers.

The vehicle 161 may include a vehicle system 160 that includes a vehicle processor 163, camera 165, transceiver 167, vehicle compartment 169 (and a controller or controllers associated with the vehicle compartment 169), microphone 171, and other systems or sub-systems (e.g., navigation system). The vehicle compartment 169 may include a glovebox, trunk (e.g., front trunk or rear trunk), door, sunroof, moonroof, etc. The vehicle system 160 may also include a navigation apparatus. The navigation apparatus may be a portable terminal, such as a smart phone having a navigation function. The vehicle processor 163 may be utilized to send or collect data and other information from the camera 165, transceiver 167, a controller associated with the vehicle compartment 169, and the microphone 171. For example, the vehicle processor 163 may be utilized to send instructions or commands to controllers associated with the vehicle compartment 169 to unlock or to provide access to the vehicle compartment 169. The transceiver 167 may be utilized to communicate with the delivery vehicle 140 and mobile device 112 of the user 110 via the remote server 120 (e.g., cloud) and associated telecommunications network. The transceiver 167 may be a telematics system or mobile device paired with the vehicle system 160 via the transceiver 167 (e.g., Bluetooth transceiver or any wired or wireless transceiver). The microphone 171 may be allowed to receive spoken dialogue commands from a user in one embodiment. The microphone 171 may be configured to receive speech from the user 110 (e.g., the owner of the vehicle or someone who may utilize the vehicle), a delivery person or any other person. Additionally, the microphone 171 may allow a third party (e.g., a delivery person) to communicate with a remote person (e.g., user 110 or someone with authorization to unlock the vehicle 161) utilizing the microphone 171. The microphone 171 may be located in an interior cabin of the vehicle 161 (such as a passenger cabin), or may be located in an exterior location of the vehicle 161.

The vehicle system 160 may include at least one camera 165. In one embodiment, the camera 165 may be mounted in the rear-view mirror. In other embodiments, the camera 165 may be located anywhere in the vehicle cabin or outside of the vehicle 161, such as the sides of the vehicle cabin or top of the vehicle cabin. The camera 165 may also be facing out of the vehicle cabin through a windshield of the vehicle 161 to collect imagery data of the environment in front of the vehicle 161. The camera 165 may be utilized to collect information and data regarding the front of the vehicle 161 and for monitoring the conditions ahead and/or around the vehicle 161. The camera 165 may also be used for monitoring the conditions ahead of the vehicle 161 and correctly detecting the positions of lane markers as viewed from the position of the camera 165 and the presence/absence, for example, of lighting of the head lights of oncoming vehicles. For example, the camera 165 may be utilized to generate image data related to the vehicle's surrounding, lane markings ahead, and other types of object detection (e.g., pedestrians, vehicles, cyclists, light posts, parking spots, etc.). The vehicle 161 may also be equipped with a rear camera (not shown) for similar circumstances, such as monitoring the vehicle's environment around the rear proximity of the vehicle. The camera 165 may be utilized to detect the delivery package being delivered utilizing image recognition or scanning a quick response (QR) code. The camera 165 may also be utilized to detect the delivery vehicle or the delivery driver, as well as other objects related to the delivery as discussed further below.

The camera 165 may also be an in-vehicle camera that may be mounted in the vehicle 161 to monitor occupants (e.g., a driver or passenger) within the vehicle cabin. The in-vehicle camera may be utilized to capture images of the vehicle cabin. For example, the in-vehicle camera may be utilized to obtain facial information from the delivery driver or the delivery package (e.g., a box). The in-vehicle camera may be a color camera, infrared camera, or time-of-flight camera. The in-vehicle camera may be mounted on a head rest, in the headliner, or located on a mobile device (e.g., tablet or mobile phone).

Figure 2:
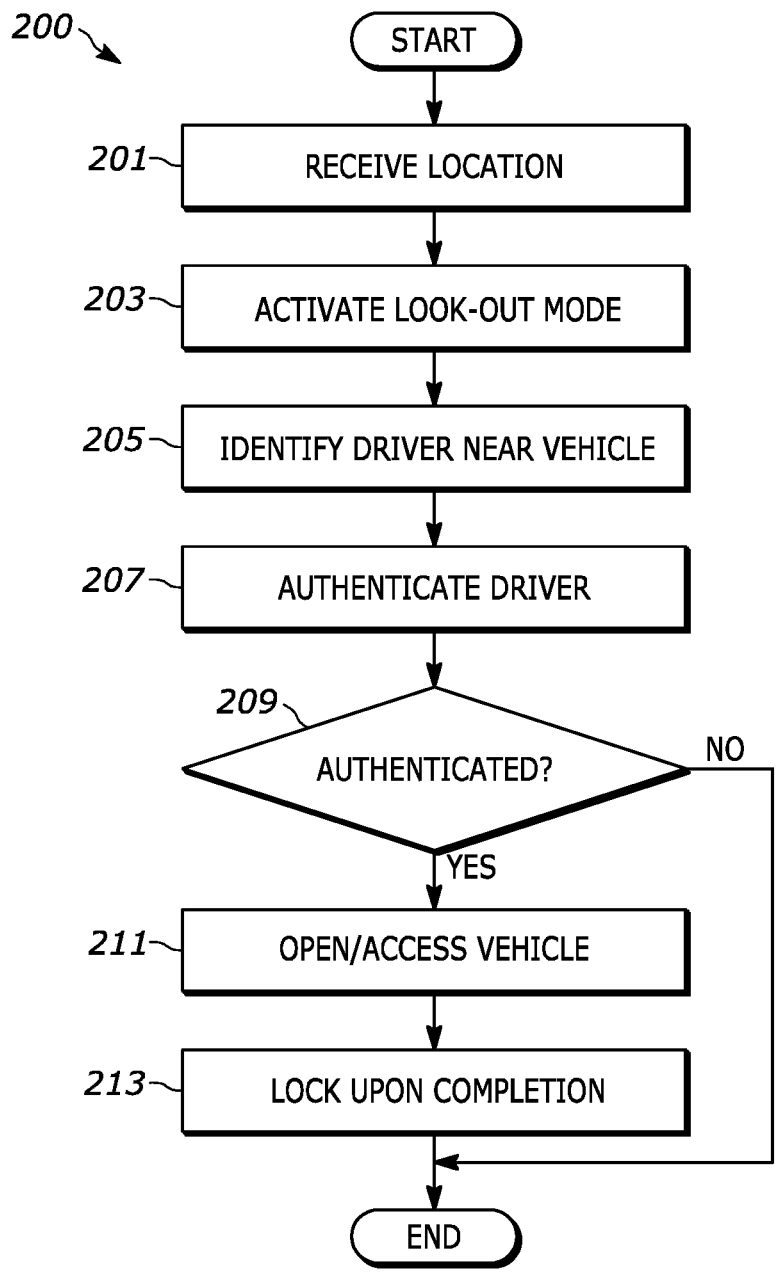
FIG. 2 illustrates an exemplary flowchart 200 of a vehicle preparing for a delivery.

FIG. 2 is an exemplary flowchart 200 of a vehicle system utilizing a delivery authentication system. In one example, a car owner (e.g., user 110) may receive a message (e.g., text message, email, etc.) from a delivery driver that a delivery is incoming to the vehicle 161. The delivery driver may be a government employee (e.g., United States Postal Service employee) or private employee (e.g., Federal Express employee, Amazon employee, etc.). In another embodiment, the vehicle may receive a delivery from a drone or a robot that may also be authenticated. In another embodiment, the vehicle system may be preparing for a visit from a service person (e.g., a windshield replacement or a tire replacement from service provider, etc.). At step 201, the vehicle may receive GPS location of the delivery driver to identify when the delivery is approaching. The delivery driver may broadcast GPS data continuously, periodically, or a combination thereof. In one example, a vehicle application may send the car a notification that the delivery driver may be delivering items at the vehicle. The notification may include a message that indicates an estimated arrival time or GPS coordinates of the delivery driver. A mobile device or GPS system located on the delivery vehicle may send a location of the delivery driver (or associated delivery trunk) to the vehicle or remote server to monitor its location to the vehicle. A threshold distance may be established to identify a proximate location to the vehicle where the vehicle may begin a look-out mode. The threshold distance may be a ¼ mile, ½ mile, one mile, 500 feet, 1000 feet, 2000 feet, or any distance deemed appropriate. The threshold distance may include a default distance or may be adjustable, and thus changed by users or vehicle technicians. The system may constantly monitor a location of the delivery driver and/or the car. In another embodiment, the system may utilize a threshold time of arrival, rather than a distance, to define when the vehicle may begin a look-out mode. For example, if the estimated time of arrival of the delivery is within one minute, two minutes, five minutes, or any other time period, the system may begin activation. Such an embodiment may factor in a function class of roads that the delivery driver is utilizing, as well as traffic flow, to identify when to activate the look-out mode. For example, the system may factor in whether the delivery vehicle is located on a highway or a residential road, and the traffic conditions of those roads, to more accurately determine when the delivery driver will arrive at the vehicle. Thus, the look-out mode can be activated considering such factors.

At step 203, the system may activate look-out mode. When activated, the look-out mode may begin to scan for images or record videos of areas surrounding the vehicle. The look-out mode may, for example, begin capturing images utilizing the camera in a cyclical fashion. For example, the vehicle may take pictures and capture images every 30 seconds, every minute, every two minutes, every five minutes, etc. Timing of the cycle for the camera to record or capture images may also be a default time or may be adjustable by users or vehicle technicians. In one example, look-out mode may be activated based on the delivery vehicle being within the threshold distance. In another example, look-out mode may be activated based on a request sent from a mobile device (e.g., application), as discussed in more detail below with respect to FIG. 3.

At step 205, the system may determine if the delivery driver is at a nearby location and outside the vehicle by utilizing the various cameras and components in the vehicle. When look-out mode is activated, the vehicle may start with a 360-degree scan of a perimeter of the vehicle to determine approaching vehicles, objects, or persons. The vehicle may conduct various activities utilizing front facing cameras, back-up cameras, rear view mirror monitors, etc. Additionally, the vehicle may utilize sonar waves from various radars (or similar sensors) on the vehicle, vehicle-to-object (V2X) communication, cyclical measurements to determine objects approaching versus moving away from the vehicle, etc. The vehicle may utilize a camera to look for facial recognition, logos (e.g., delivery driver's company logo), QR codes, badge recognition (e.g., zoom into a badge to identify an image), license plate recognition, make/model recognition of a delivery vehicle, or possible live feed. The camera may also utilize motion tracking to identify various objects, including the delivery driver, as well as the owner of the vehicle or any person walking near the vehicle. Once the camera identifies various people and captures images, it may be utilized to identify the driver of the delivery vehicle.

At step 207, a delivery driver may be authenticated. The authentication may occur utilizing components of the vehicle, remote server, or utilizing an application on a mobile device, tablet, or other computer. Furthermore, the authentication may happen via authentication at the vehicle, authentication at a remote server, or authentication by a remote user (e.g., owner of the vehicle). In one example, the vehicle may authenticate the delivery driver by scanning a QR code provided to the delivery driver. The QR code may be scanned by utilizing a camera located on an exterior of the vehicle surface, or any other vehicle camera. In another embodiment, the vehicle may be equipped with an RFID (radio frequency identification) scanner that scans an RFID tag associated with the delivery driver. In another embodiment, a vehicle camera may utilize facial recognition or other identification to recognize the delivery driver. In yet another embodiment, the delivery person may input a numerical code onto a keypad entry of a vehicle door. A vehicle camera scans the barcode or QR code and takes a snap shot of image. The vehicle camera may identify a package being placed near the camera based on image identification systems.

At decision 209, the vehicle may determine if the person (e.g., delivery driver) approaching the vehicle is authenticated or not. In one example, the vehicle may cross check data with delivery-associated servers to authenticate the delivery driver. The vehicle may send image data or the scanned barcode/QR code information to ensure authentication. Captured information may be passed to the remote server for authentication. The remote server may cross reference the details and validate the identity of the driver. The server may send the data to the vehicle indicating that the driver is either authenticated or not. In an alternative embodiment, a microphone may be located on an interior or exterior of the vehicle. The microphone may allow the delivery driver to communicate with the remote vehicle owner. The remote vehicle owner may speak into a microphone located on a mobile device, tablet, or other device to talk to the delivery driver. The remote vehicle owner's speech may be outputted to a vehicle speaker to allow the delivery driver to communicate. For example, if the delivery driver is not authenticated, the remote vehicle owner may be allowed to speak to the delivery driver to determine who the delivery driver is that may be attempting access to the vehicle. In another example, if the driver is not authenticated, then the system will not allow access to the vehicle.

At step 211, the vehicle owner grants permission to access a certain aspect of the vehicle if the delivery driver is authenticated. For example, the vehicle owner may allow access to a trunk (e.g., front or rear), door, glovebox, sun roof, back seat, or other area of the vehicle. The vehicle owner may have various options to allow access to or allow access in the vehicle. A signal may be sent that activates the trunk to unlock or a certain door to unlock or open. In another embodiment, a signal may be sent to unlock the glovebox, open the sunroof, unlock a door adjacent the back seat, or other compartment of the vehicle. In another embodiment, a default compartment or component may be accessed or unlocked that does not require user interaction to select the access area for the delivery, such as the vehicle trunk (e.g., front or rear), door, glovebox, sun roof, or any other area of the vehicle.

At step 213, the vehicle may lock or secure the vehicle upon a successful delivery. The vehicle may utilize various sensors to determine that the delivery has been successful. For example, the vehicle may include weight sensors and determine that the delivery is on the vehicle by analyzing a change of weight in the vehicle. An interior camera may also detect that the delivery is in the vehicle. The vehicle may also lock after a certain duration of the compartment or door being closed. In another example, the vehicle may also lock the car when the delivery person confirms that the package is in the vehicle. The delivery person can confirm the package is in the vehicle by pressing a certain button on the vehicle (e.g., door lock, combination of buttons, etc.) or through an application associated with a mobile device of the delivery person.

Figure 3:
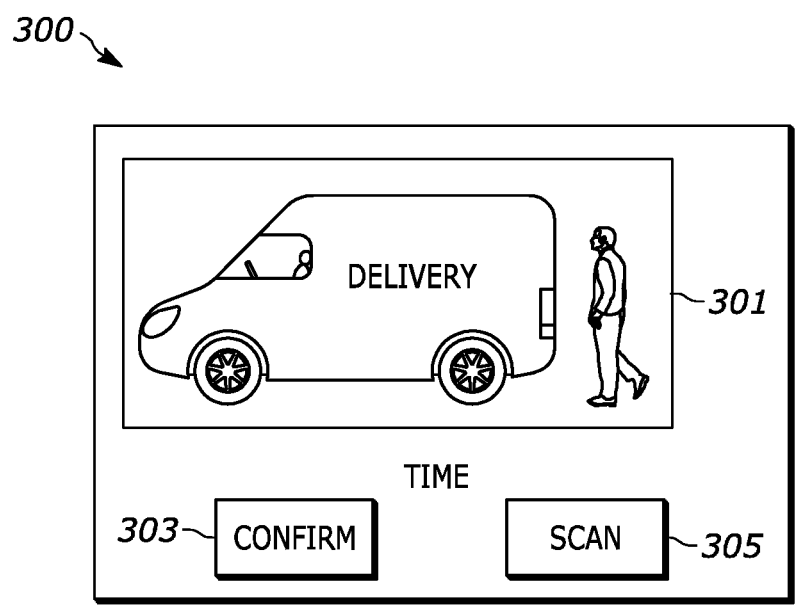
FIG. 3 illustrates an example user interface 300 of a message or application sent to a vehicle owner.

FIG. 3 illustrates an example user interface 300 of a message or application sent to an electronic device associated with the vehicle owner. The user interface 300 may be part of an application that is loaded on a computer, mobile device, tablet, or similar device. The user interface 300 may also be found in a SMS (short message service) message that may be sent to the vehicle owner. The user interface 300 may send an image 301 of a detected vehicle, object, or person that is identified during activation of look-out mode. The image 301 may be sent to the vehicle owner (e.g., mobile device associated with the vehicle owner) when the vehicle owner is remote from the vehicle. In another example, the image 301 may include digital video recordings or a live stream. The image 301 may be captured by one of the various cameras located on the vehicle. The vehicle camera may store the image 301 or recordings, which are then set sent to the user interface 300 either directly or indirectly (e.g., sent to a remote server first). For example, a telematics unit with a wireless transceiver in the vehicle may directly send recordings to a user. In another embodiment, the remote server may first receive the photo and/or videos from the vehicle and then send them to the mobile device associated with the vehicle owner.

The user interface 300 may include various options or actions for the vehicle owner to utilize once the image 301 is presented. For example, the user interface 300 may include a confirmation button 303. The confirmation button 303 may be utilized to confirm that the delivery driver is authenticated. Once the confirmation button 303 is activated, the system may start authenticating the delivery, as discussed in FIG. 3 above and FIG. 4 below. The user interface 300 may also include a scan button 305. The scan button 305 may be utilized to activate the look-out mode regardless of the vehicle's current status or distance of the delivery driver. For example, upon pressing the scan button 305, a signal may be sent from the mobile phone to the vehicle to begin capturing images or videos of the vehicle's surrounding, which are sent back to the user interface 300 and displayed as image 301. The scan button 305 may be beneficial in situations where the location of the driver is unknown or the vehicle has not automatically activated the look-out mode.

Figure 4:
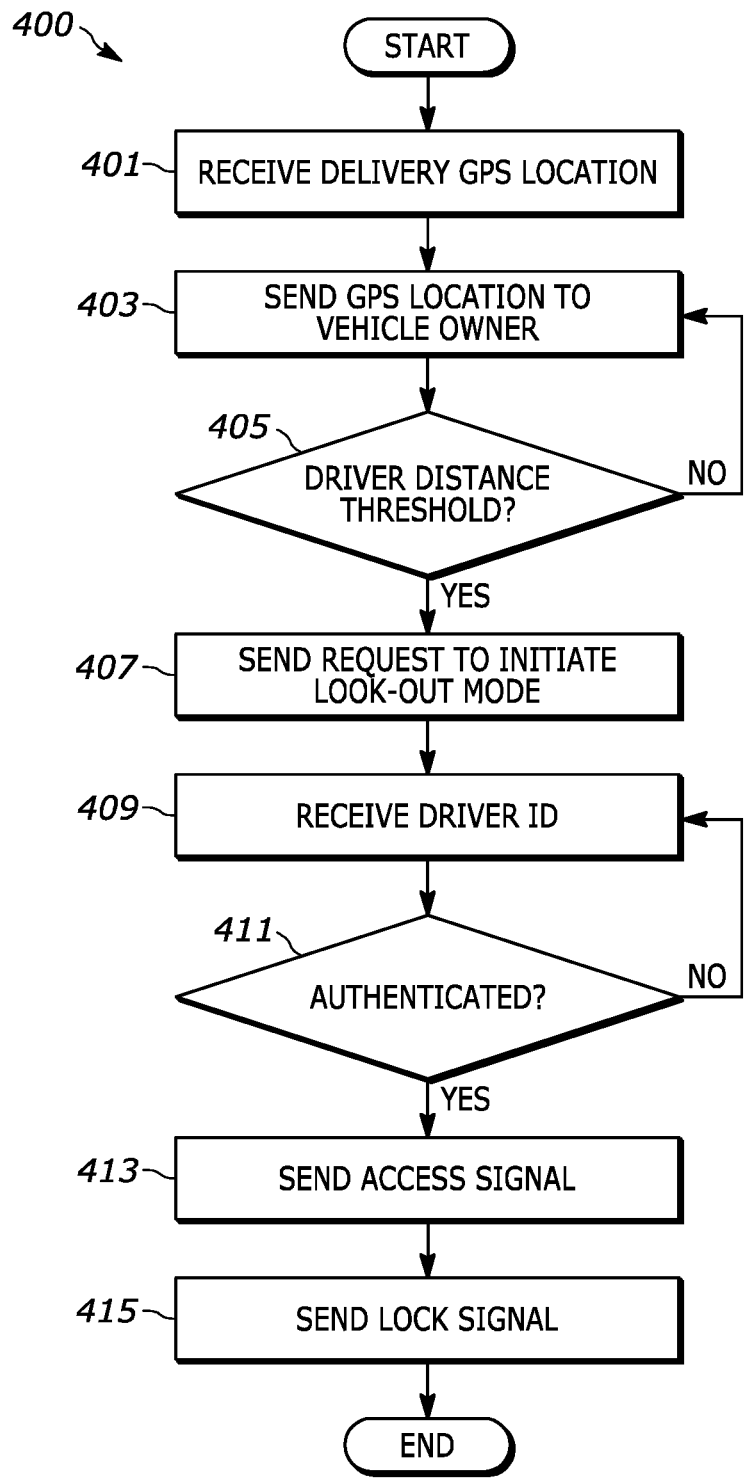
FIG. 4 illustrates an exemplary flowchart 400 of a server preparing and authenticating a vehicle delivery.

FIG. 4 illustrates an exemplary flowchart 400 of a server preparing and authenticating a vehicle delivery. In one example, the server may be the remote server 120 discussed with respect to FIG. 1. At step 401, the server may receive a GPS location of a delivery driver or delivery vehicle. The GPS location may be utilized to identify a location of the delivery driver or delivery vehicle to identify how close the delivery is to the vehicle. The GPS location may be associated with a navigation system or telematics unit of the delivery vehicle, or a mobile device associated with the delivery driver. At step 403, the server may send the GPS location associated with the delivery (e.g., delivery vehicle or delivery driver) to the vehicle owner (e.g., application or SMS message to mobile device, tablet, computer, etc.). The GPS location associated with the delivery may be sent automatically at a reoccurring interval (e.g., every 30 seconds, minute, etc.), or by a request from the vehicle owner.

At decision 405, the server may determine if the delivery is within a threshold distance from the vehicle. For example, the server may determine whether the distance between the delivery vehicle and the vehicle is less than the threshold distance. If the delivery vehicle is not within the threshold distance (e.g., the distance between the delivery vehicle and the vehicle is greater than the threshold distance), the server may continue to monitor the GPS location of the delivery (e.g., via the delivery vehicle or delivery driver). If the delivery is within the threshold distance (e.g., the distance between the delivery vehicle and the vehicle is less than the threshold distance), the system may continue to begin preparation and authentication of the delivery (e.g., authenticating the delivery vehicle, delivery person, package, etc.). The threshold distance may be any distance, such as 100 feet, 200 feet, 400 feet, etc. The threshold distance may be a default distance set by a manufacturer or set by the vehicle owner or operator of the system via a setting.

If the delivery distance is less than the threshold distance, the vehicle may send a request to the vehicle to initiate look-out mode at step 407. A wireless signal may be sent to begin initiation of look-out mode. In another embodiment, the server may receive a request to initiate look-out mode that is initiated by the vehicle owner via an application. As discussed above, the vehicle may start with a 360-degree scan of a perimeter of the vehicle to determine approaching vehicles, objects, or persons to identify the delivery. The vehicle camera may search for identification of the delivery, such as the delivery driver's company logo, QR codes, badge, license plate, make/model of the delivery vehicle, etc. At step 409, the server may receive the driver or delivery identification at the server upon being scanned.

At decision 411, the system may authenticate the identification associated with the delivery. Such identification may include those discussed above (e.g., delivery driver's company logo, QR codes, badge, license plate, make/model of the delivery vehicle, etc.). The server may compare the scanned image of the identification to correct identifier to assist in the authorization of the delivery. For example, the server may compare the scanned license plate to the correct license plate number allowed for authorization to identify a match. If the identification is not authenticated, the system may proceed to continue to monitor the identification of the delivery. Thus, the server may continue to monitor the images and the feed for the appropriate identification device and/or identifier, which may include but is not limited to the delivery driver's company logo, delivery driver's face, QR codes, badge, license plate, make/model of the delivery vehicle, etc. For example, the identification device may include an RFID tag to authenticate the delivery driver.

At step 413, the system may send an access signal to the vehicle upon the server authenticating the identifier (e.g., delivery driver's face, company logo, QR codes, badge, license plate, make/model of the delivery vehicle, etc.). The access signal may include a request to unlock a vehicle door or compartment (e.g., trunk), open a window, sunroof, trunk, etc. The request may be processed at the vehicle processor, which in turn sends a command on a vehicle communication bus (e.g., Controller Area Network (CAN), Local Interconnect Network (LIN), etc.) to the accompanying associated controllers of the vehicle compartment or component to either unlock or open. For example, the vehicle processor may send a request to a controller associated with a vehicle door to unlock the vehicle.

At step 415, the server may send a lock signal to the vehicle upon completion of the delivery. While in certain embodiments the vehicle may automatically lock after delivery, other embodiments may have the server send requests to lock the vehicle. Thus, the server may act as a back-up or fail safe to ensure the vehicle is secured. For example, after the delivery driver has completed the delivery, the server may send a request to lock the vehicle after a certain time period (e.g., immediately, five seconds, ten seconds, or any duration). In one example, the vehicle processor may send a request to the controller associated with the vehicle door to lock the vehicle.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system in a vehicle, comprising:
   a camera configured to capture images proximate the vehicle;
   a transceiver configured to communicate with a remote server;
   a processor in communication with the camera and the transceiver and programmed to:
      determine a delivery driver is located proximate the vehicle in response to a signal from the remote server;
      send a request to the camera to capture one or more images of the delivery driver in response to a location of the delivery driver within a threshold distance from the vehicle;
      send one or more images of the delivery driver to a remote server; and
      send an activation signal, in response to authentication of the one or more images of the delivery driver via the remote server, to one or more vehicle components to allow access to an area of the vehicle.

2. The system of claim 1, wherein the processor is further programmed to request the camera to capture one or more images of the delivery driver in response to the location of the delivery driver within a threshold arrival time of the delivery driver.

3. The system of claim 1, wherein the processor is further programmed to request the camera to capture one or more images of the delivery driver in response to a remote request from a mobile device associated with the vehicle and in communication with the transceiver.

4. The system of claim 1, wherein the activation signal includes signals opening a sunroof or window of the vehicle.

5. The system of claim 1, wherein the activation signal includes signals unlocking a door of the vehicle.

6. The system of claim 1, wherein the activation signal includes signals unlocking a trunk of the vehicle.

7. The system of claim 1, wherein the system includes an external microphone configured to receive voice information from the delivery driver.

8. The system of claim 7, wherein the processor is further programmed to send the voice information to a mobile device associated with an owner of the vehicle.

9. A vehicle of claim 1, wherein the processor is further programmed to send a locking signal to the one or more vehicle components in response to detection of a successful delivery.

10. The system of claim 1, wherein the processor is further the processor is further programmed to send a locking signal to the one or more vehicle components upon completing a threshold duration.

11. A server, comprising:
    a transceiver configured to communicate with a vehicle remote from the server; and
    a processor in communication with the transceiver and programmed to:
       determine a delivery driver is located proximate the vehicle in response to a location received from the delivery driver;
       send a request to capture one or more images of the delivery driver upon the determination that the delivery driver is proximate to the vehicle;
       receive one or more images from the vehicle or a mobile device associated with the vehicle; and
       send an activation signal, in response to authentication of the one or more images of the delivery driver via the remote server, to one or more vehicle components to allow access to an area of the vehicle in response to authentication of the one or more images.

12. The server of claim 11, wherein the processor is further configured to send a QR code to a mobile device associated with the delivery driver, and wherein the one or more images includes a QR code.

13. The server of claim 11, wherein the processor is further programmed to receive voice information from a vehicle mic and send the voice information to the mobile device associated with the vehicle.

14. A system in a vehicle, comprising:
    a camera configured to capture images proximate to the vehicle;
    a transceiver configured to communicate with a remote server; and
    a processor in communication with the camera and the transceiver and programmed to:
       send a request to the camera to take one or more images proximate to the vehicle in response to a location of a delivery driver within a threshold distance from the vehicle;
       send one or more images of the delivery driver to the remote server; and
       send an activation signal, in response to authentication of the one or more images of the delivery driver via the remote server, to one or more vehicle components to allow access to an area of the vehicle.

15. The system of claim 14, wherein the processor is further programmed to send the activation signal in response to an authentication signal received from the delivery driver.

16. The system of claim 15, wherein the authentication signal includes an RFID signal from an RFID tag of the delivery driver.

17. The system of claim 14, wherein the camera is further configured to scan a QR code and the processor is further programmed to send the activation signal in response to the QR code.

18. The system of claim 14, wherein the one or more vehicle components includes a trunk, door, sunroof, or window.

19. The system of claim 14, wherein the processor is further programmed to send the request to the camera to take one or more images in response to motion detection.

20. The system of claim 14, wherein the system includes an external microphone configured to receive voice information from the delivery driver.

* * * * *